United States Patent [19]
Swensen

[11] 3,914,309
[45] Oct. 21, 1975

[54] SENSING DEVICE

[76] Inventor: Eugene T. Swensen, 2400 W. 102nd St., Apt. 313, Minneapolis, Minn. 55431

[22] Filed: Dec. 26, 1973

[21] Appl. No.: 428,072

[52] U.S. Cl.......... 250/569; 235/61.11 E; 250/221; 250/222 R; 250/539; 250/570; 250/578
[51] Int. Cl.².................. G01D 21/04; G06K 7/10; G06M 7/00
[58] Field of Search .......... 250/239, 569, 570, 221, 250/222 R, 578; 235/61.11 E

[56] References Cited
UNITED STATES PATENTS

| | | |
|---|---|---|
| 3,474,252 | 10/1969 | Jacobsen............................. 250/221 |
| 3,621,268 | 11/1971 | Friedrich ............................ 250/221 |
| 3,639,770 | 2/1972 | Zizelmann .......................... 250/221 |
| 3,676,690 | 7/1972 | McMillin et al.............. 235/61.11 E |
| 3,697,762 | 10/1972 | Kurtz.................................. 250/239 |
| 3,774,039 | 11/1973 | Price................................... 250/221 |

*Primary Examiner*—James W. Lawrence
*Assistant Examiner*—T. N. Grigsby
*Attorney, Agent, or Firm*—Norman P. Friederichs

[57] ABSTRACT

A radiation sensing device including a radiation source and a detector disposed in-line within a package.

7 Claims, 6 Drawing Figures

U.S. Patent  Oct. 21, 1975  3,914,309
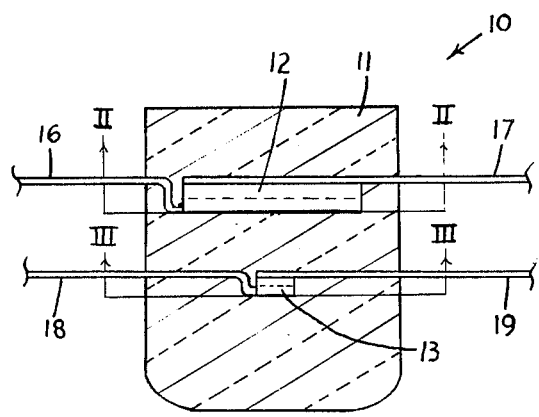
FIG. I
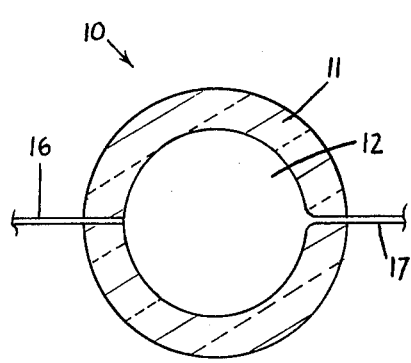
FIG. II
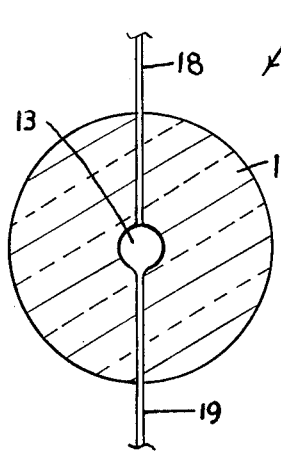
FIG. III
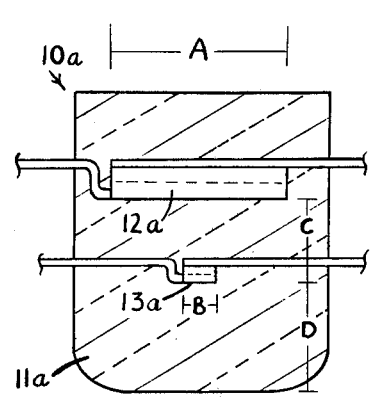
FIG. V
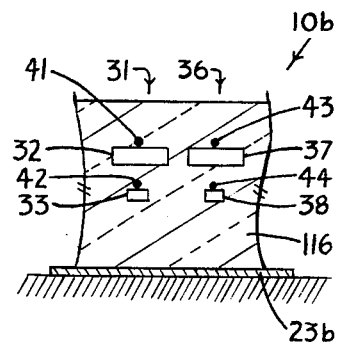
FIG. VI
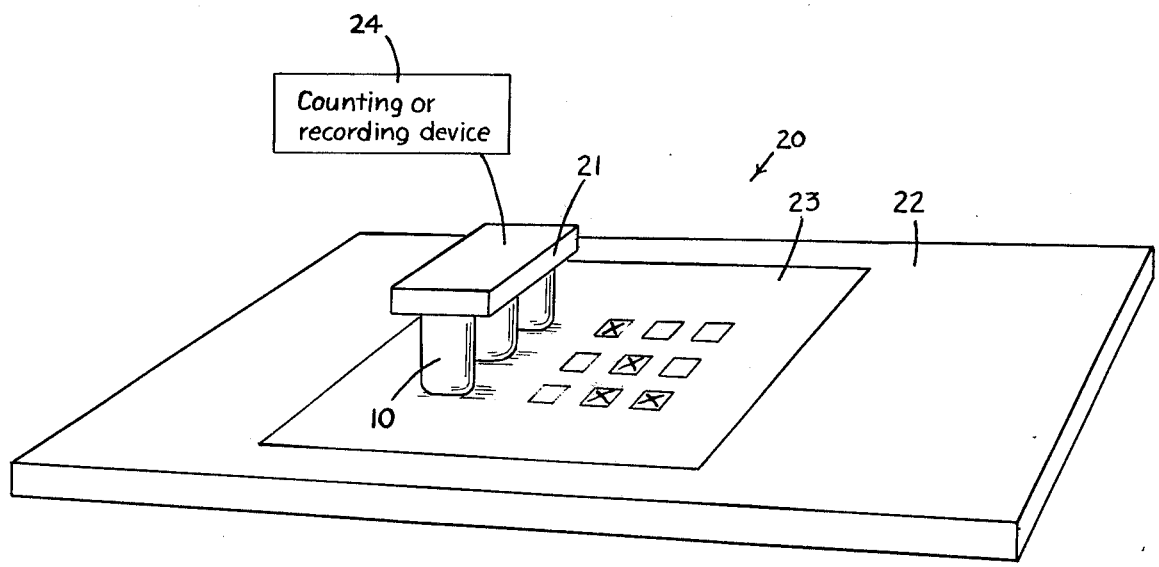
FIG. IV

SENSING DEVICE

Background of the Invention

The present invention relates to radiation sensing apparatus and more particularly to a device for sensing radiation reflected from a surface.

In the past a wide variety of radiation sensing devices have been available. Illustrative of such devices are the automatic door openers commonly found in use at grocery stores. A radiation source is disposed adjacent one side of a customer pathway and a radiation detector is placed adjacent the other side of the pathway. A radiation beam normally extends from the source to the detector or receiver. If a customer walks along the pathway and breaks the beam, the detector recognizes the break and transmits the information to certain equipment which opens the door for the customer. In such apparatus, radiation travels directly from the radiation source to the radiation detector unless some object breaks the beam.

Other types of apparatus utilize reflected radiation. Illustrative of such apparatus is that disclosed in U.S. Reissue Pat. No. 26,915. Such apparatus includes a radiation source identified as an incandescent lamp, a lens for focusing the radiation from the lamp, a photocell for sensing the reflected radiation and a lens for focusing the radiation moving to the photocell. This apparatus is stated to be useful in counting articles carried along a conveyor belt. The apparatus operates with radiation emitting from the lamp and being focused on the pathway traversed by the articles. If the focused beam falls on an article, the beam is reflected to the second lens which focuses the reflected light into the photocell and the article is counted. The article moves out of the pathway of the beam and radiation is no longer reflected, thus radiation is not received by the detector.

The known devices are unsuited for recognizing small marks, such as pencil marks on a paper sheet. For example, the former is not suitable since a paper with pencil marks would continuously break the beam in spite of the pencil marks. In other words, the discontinuous pencil marks would not open and close the radiation beam. The apparatus shown in U.S. Re. Pat. No. 26,915 is not suitable since the complexity necessitates structure too large to identify things as small as a pencil mark. Moreover, to operate efficiently one desireably operates a plurality of sensors thus simultaneously reading a plurality of columns of marks or reading an entire page instantaneously.

The present invention provides a solid-state sensing device having a lignment of the radiation emitting diode and the photo-transistor. In other words, the device has in-line, vertical stacking of miniature, compatible sensor components (i.e. emitter and receiver). The present invention provides significant advantages over prior solid-state sensing devices. In the past, solid-state sensing devices which have operated in the reflective mode have had side-by-side emitters and receivers. The prior solid-state sensing devices have used angular reflection of radiation. Such known side-by-side devices have required a volume greater than 1 cubic inch. The present invention may occupy a significantly smaller volume thus allowing much higher density of sensors. The present invention provides a sensor that has no minimum field-of-vision. In other words, the sensor may be in direct contact with the sheet to be read. The present sensor, since it has no minimum field-of-vision, is capable of reading very small marks. For example, the present sensor may read a mark having a radius of as small as 0.005 inches.

In the Drawings

FIG. I shows a cross sectional view of the sensing device of the present invention;

FIG. II illustrates a cross sectional view taken along the line II—II in FIG. I;

FIG. III shows a cross sectional view taken along the line III—III in FIG. I;

FIG. IV shows a view of apparatus incorporating a plurality of sensing devices;

FIG. V shows a preferred arrangement of the elements of the sensing device of FIG. I;

FIG. VI shows an embodiment of the present invention in which the sensing device includes a plurality of sets of elements.

Detailed Description of the Present Invention

The apparatus 10 of the present invention, as shown in FIGS. I–III, may include a package or envelope 11, an emitter 12 and a receiver 13. The package 11 may be of any material that is transparent to the particular radiation utilized by the apparatus. Preferred package material is either an epoxy material or conventional glass. Of course, various other materials may be used.

The emitter 12 may be any micro element that is capable of emitting a measurable reflected radiation. A typical emitter may be constructed of gallium arsenide which emits an infrared radiation. Illustrative of such an emitter is one produced by Motorola of Phoenix, Arizona, under the designation MLED 60. This emitter has a high power output of 550 $\mu$Watts at an $I_F$ of 50 m Amps. The infrared emission is typically 9000 A. The emitter 12 alternatively may be a tungsten filament which emits a radiation of a broad spectrum. The emitter 12 has power leads 16 and 17 for connection to any suitable power source (not shown).

The receiver 13 may be any micro radiation sensitive material i.e. a photo transistor. One suitable receiver is a micro silicon slice or wafer. The receiver 13 may be simply a photo diode; however, if desired, the receiver 13 may be biased thereby controlling the level at which sensing takes place. Illustrative of a suitable receiver is an NPN Silicon photo transistor produced by Motorola of Phoenix, Arizona, under the designation MRD 150. The receiver 13 has appropriate electrical leads such as 18 and 19 for connection to a recording device. In this embodiment the leads 18 and 19 preferably approach the package at right angles to the leads 16 and 17 of the emitter 12.

The emitter 12 and the receiver 13 are aligned within the package 11. The emitter 12 and the receiver 13 may be so placed in the package 11 that the shadow of the receiver 13 falls within the package. Thus the sensing device 10 may be placed very close to the sheet thereby substantially reducing or eliminating interference from outside radiation or radiation from other adjacent sensing devices. The sensing device 10 is lensless or in other words has zero focus.

The sensing device 10 may be part of a larger reading apparatus 20 (FIG. IV). The reading apparatus 20 may include a housing 21 in which one or more sensing devices 10 may be mounted. The apparatus 20 may include a support surface 22 on which the sheet 23 to be read may be supported. The sheet 23 has areas or zones that reflect radiation and other areas that reflect less or no radiation. The former may be simply bare areas of paper or cardboard sheet and the latter may be pencil or pen markings on the sheet. Alternatively, the latter may be punched holes in the sheet. The apparatus 20 further may include device 24 to sense changes in the receiver 13 when the receiver 13 recognizes a mark or an opening on a sheet. The device 24 may simply be a volt meter or an amp meter. Alternatively, the device 24 may be a sophisticated device to record sensings and even print out complex data. Such a sophisticated device is known.

A preferred sensing device 10a is shown in FIG. V. The sensing device 10a has an emitter 12a and a receiver 13a which are contained within a package or envelope 11a. The envelope 11a, emitter 12a, and receiver 13a may be constructed of the same materials as described with respect to device 10. The effective width of emitter 12a is designated by the letter "A." The effective width of the receiver 13a is designated by the letter "B." The spacing between the lower surface of the receiver 13a is shown by the letter "C." The spacing between the lower surface of the receiver 13a and the lower surface of the envelope 11a is shown by the letter "D."

Another preferred embodiment 10b is disclosed in FIG. VI. The sensing device 10b has a single envelope 11b which contains a plurality of sensing sets of emitters and receivers such as sensing set 31 including emitter 32, receiver 33 and sensing set 36 including emitter 37, receiver 38. The emitters 32 and 37, as well as the receivers 33 and 38, have appropriate lead wires such as 41, 42, 43 and 44 respectively. This arrangement permits the placement of many sensing sets in close proximity to each other, thus providing for simultaneous reading of many indecia. For example, a device 10b having a single envelope 11b may be suitable for reading an entire page 23b of indecia instanteously.

Various modifications may be made without departing from the scope of the present invention as defined in the following claims.

What is claimed is:

1. A device for sensing radiation reflected from a surface, said radiation sensing device comprising:
   a micro emitter for emitting a beam of radiation;
   a photo transistor for sensing reflected radiation, said photo transistor being disposed within the direct path of said radiation beam; and
   a transparent package for containing said micro emitter and said photo transistor;
   whereby the beam of radiation may travel past the photo transistor and when striking a reflective surface is returned to the photo transistor where the reflected beam is sensed.

2. The sensing device of claim 1 wherein said device consists of a single unit transparent package, a gallium arsenide diode and a silicon wafer photo transistor.

3. The sensing device of claim 1 wherein the photo transistor casts a shadow while lying within said direct beam and wherein said photo transistor is positioned with respect to said micro emitter such that said shadow lies entirely within the package.

4. The radiation sensing device of claim 1 wherein said sensing device includes a single package containing a plurality of sensing sets, each sensing set consisting of a radiation emitter and a photo transistor.

5. The radiation sensing device of claim 4 wherein the emitter and the transistor of each set are in line.

6. The sensing device of claim 4 wherein said radiation emitter is a gallium arsenide diode.

7. The sensing device of claim 4 wherein said photo transistor is a silicon wafer.

* * * * *